United States Patent
Sexton (10) Patent No.: US 10,239,034 B2
(45) Date of Patent: Mar. 26, 2019

(54) FCC CYCLONE USING ACOUSTIC DETECTORS

(75) Inventor: Jeffrey A. Sexton, Findlay, OH (US)

(73) Assignee: Marathon Petroleum Company LP, Findlay, OH (US)

(*) Notice: Subject to any disclaimer, the term of this patent is extended or adjusted under 35 U.S.C. 154(b) by 930 days.

(21) Appl. No.: 12/322,783

(22) Filed: Feb. 6, 2009

(65) Prior Publication Data

US 2018/0207600 A1 Jul. 26, 2018

(51) Int. Cl.
*B01J 8/00* (2006.01)
*B01J 8/18* (2006.01)
*B04C 5/08* (2006.01)
*G06F 19/00* (2018.01)
*B04C 11/00* (2006.01)

(52) U.S. Cl.
CPC ............... *B01J 8/18* (2013.01); *B01J 8/0055* (2013.01); *B04C 5/08* (2013.01); *B04C 11/00* (2013.01); *G06F 19/00* (2013.01)

(58) Field of Classification Search
CPC B01J 8/0055; B01J 38/00; B01J 2219/00049; B01J 2219/2423
USPC ......................................... 422/108, 110, 111
See application file for complete search history.

(56) References Cited

U.S. PATENT DOCUMENTS

| | | | |
|---|---|---|---|
| 3,841,144 A | 10/1974 | Baldwin | |
| 3,906,780 A | 9/1975 | Baldwin | |
| 4,357,603 A | 11/1982 | Roach et al. | |
| 4,674,337 A | 6/1987 | Jonas | |
| 4,728,348 A * | 3/1988 | Nelson et al. | ............... 422/241 |
| 4,824,016 A | 4/1989 | Cody et al. | |
| 5,022,266 A | 6/1991 | Cody et al. | |
| 5,250,807 A | 10/1993 | Sontvedt | |
| 5,257,530 A | 11/1993 | Beattie et al. | |
| 5,652,145 A | 7/1997 | Cody et al. | |
| 5,675,071 A | 10/1997 | Cody et al. | |
| 6,047,602 A * | 4/2000 | Lynnworth | ..................... 73/632 |
| 2007/0003450 A1* | 1/2007 | Burdett | .................. B01J 8/1809 422/108 |
| 2007/0202027 A1* | 8/2007 | Walker et al. | ............. 423/215.5 |

OTHER PUBLICATIONS

NPRA, 2006 Cat Cracker Seminar Transcript, National Petrochemical & Refiners Association; Aug. 1-2, 2006.
KBR, CatCracking.com, More Production—Less Risk!, Twenty Questions: Identify Probable Cause of High FCC Cagtalyst Loss, Phillip K. Niccum, Steve Tragesser, May 3-6, 2011.
NPRA, CAT-10-105 Troubleshooting FCC Catalyst Losses; Aug. 24-25, 2010, National Petrochemical & Refiners Association.

* cited by examiner

*Primary Examiner* — Timothy C Cleveland
(74) *Attorney, Agent, or Firm* — Schaffer, Schaub & Marriott Ltd (57) ABSTRACT

The FCC process relies upon cyclones to physically separate vapor gases from solid catalyst particles. This device relates to the use of acoustic detectors to allow on-line measurement of cyclone performance and assist in unit troubleshooting and monitoring. In a fluid catalytic cracking (FCC) vessel containing a cyclone for separating solids from a solids-gas mixture, the cyclone comprises an outlet and an acoustic sensor attached to the outlet of the cyclone.

8 Claims, 11 Drawing Sheets
(6 of 11 Drawing Sheet(s) Filed in Color)

FCC CYCLONE USING ACOUSTIC DETECTORS

TECHNICAL FIELD OF THE INVENTION

The FCC process relies upon cyclones to physically separate vapor gases from solid catalyst particles. This invention relates to the use of acoustic detectors to allow on-line measurement of cyclone performance and assist in unit troubleshooting and monitoring.

BACKGROUND OF THE INVENTION

Catalytic cracking is a petroleum refining process which is applied commercially on a very large scale. A majority of the refinery gasoline blending pool in the United States is produced by this process. In the catalytic cracking process heavy hydrocarbon fractions are converted into lighter products by reactions taking plate at elevated temperature in the presence of a catalyst, with the majority of the conversion or cracking occurring in the vapor phase. The feedstock is thereby converted into gasoline, distillate and other liquid cracking products as well as lighter gaseous cracking product.

During catalytic cracking, heavy material, known as coke, is deposited onto the catalyst. This reduces its catalytic activity and regeneration is desired. After removal of hydrocarbons from the spent cracking catalyst, regeneration is accomplished by burning off the coke which restores the catalyst activity. The three characteristics steps of the catalytic cracking can be therefore be distinguished: a cracking step in which the hydrocarbons are converted into lighter products, a stripping step to remove hydrocarbons adsorbed on the catalyst and a regeneration step to burn off coke from the catalyst. The regenerated catalyst is then reused in the cracking step.

The FCC process relies upon cyclones to physically separate vapor gases from solid catalyst particles. These mechanical devices are prone to failure and operating problems. When this occurs, catalyst losses increase. This can increase equipment erosion and unit emissions. The use of acoustic emission detectors allows on-line measurement of cyclone performance and assist in unit troubleshooting and monitoring.

Other objects and advantages of the present invention will become apparent to those skilled in the art upon a review of the following detailed description of the preferred embodiments and the accompanying drawings.

SUMMARY OF THE INVENTION

The FCC process relies upon cyclones to physically separate vapor gases from solid catalyst particles. These mechanical devices are prone to failure and operating problems. When this occurs, catalyst losses increase. This can increase equipment erosion and unit emissions. A previous technique to troubleshoot is use of radioactive tracers. This system places external detectors along the vessel wall and injects a radioactive isotope into the process. The detectors measure where the radioactive material goes and how quickly. The data can be interpreted to determine potential mechanical problems.

Another consideration is measurement of catalyst loading to each cyclone. There is no current method to measure loading to each individual cyclone. All engineering design practices assume equal loading. However, some riser termination devices and regen beds could result in unequal loading. Measurement of this loading would assist in process design to ensure equipment is properly sized.

Use of acoustic emission detectors will allow an on-line measurement of cyclone performance and assist in unit troubleshooting and monitoring.

BRIEF DESCRIPTION OF THE DRAWINGS

The application file contains at least one drawing executed in color. Copies of this patent or patent application publication with color drawings will be provided by the office upon request and payment of the necessary fee.

FIG. 1 is a schematic diagram of an FCCU unit comprising a reactor and a riser. FIG. 1 also shows cyclones located in the reactor.

DETAILED DESCRIPTION OF THE INVENTION

The measurement and evaluation of the efficiency and design of cyclones and movement of particles during processes has long been a subject of research. This invention relates to the use of acoustic emission (AE) monitoring techniques to evaluate the use of AE in FCC cyclones. AE has been used for a number of years in the oil offshore drilling program and has successfully used AE to detect sand particles while extracting oil from underground.

When a particle of matter is propelled in a direction using either a gas or a liquid an strikes a surface, this impact is detectable as well as measurable using suitable piezoelectric sensors. By varying the velocity of the particles, changes in the transient features can be measured and compared. The AE data is correlated with the impact behavior using particle impact on the area of interest which is used as wave propagation medium for AE sensors. A measurable difference in AE can be detected in the impacted area and is proportional to the velocity and density. The absolute values will be dependent on the particle mass and velocity and will require calibration to quantify.

The AE detectors may be applied as either a waveguide instrument mounted to each cyclone or attached to an existing structure. The following is a description of the application of this concept.

Figure 1:
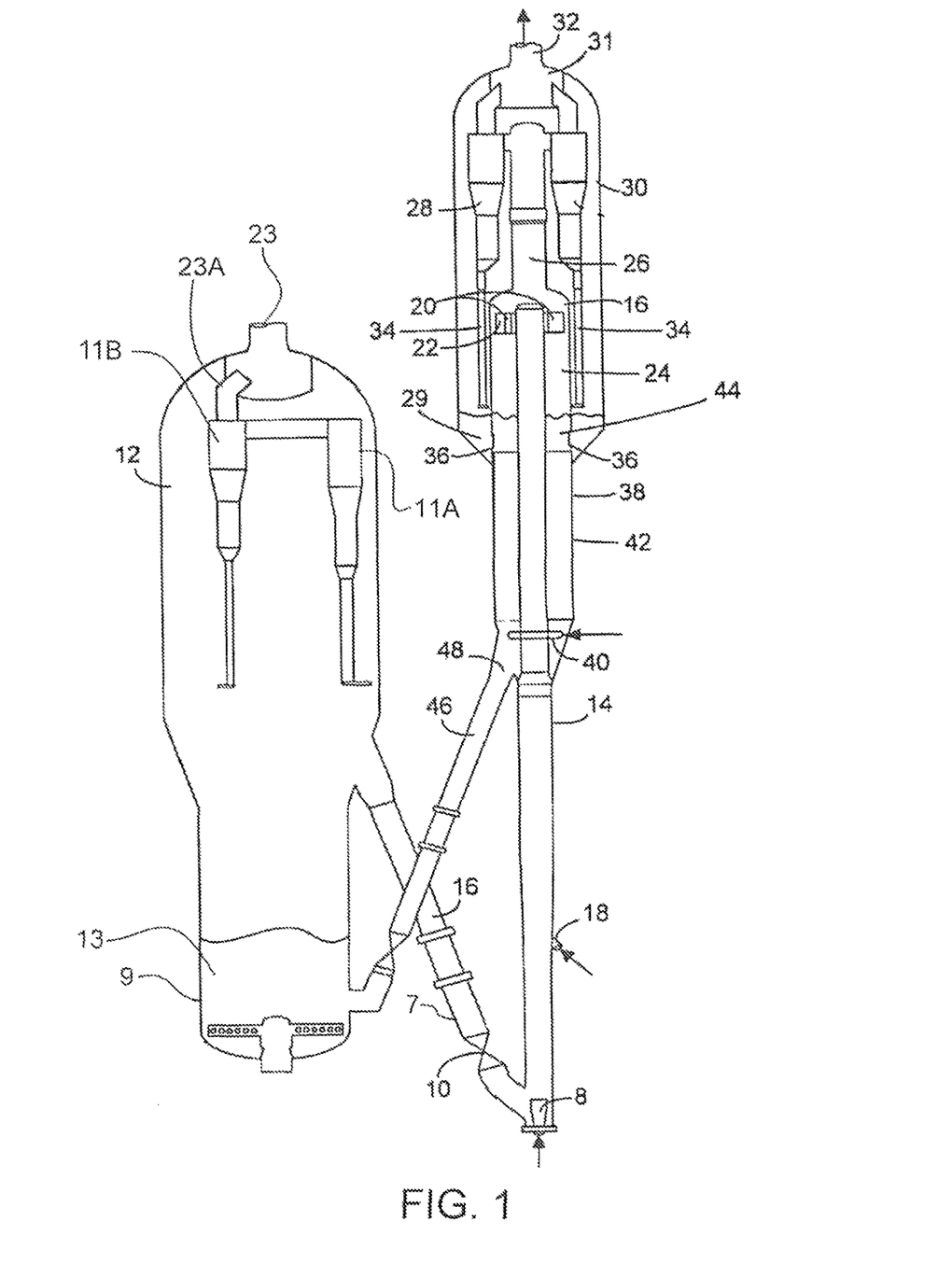

FIG. 1 is a schematic diagram of a typical FCC unit showing a regenerator, separator and stripper. FIG. 1 shows an FCC unit, comprising standpipe 16 that transfers catalyst from regenerator 12 at a rate regulated by slide valve 10. A fluidization medium from nozzle 8 transports catalyst upwardly through a lower portion of a riser 14 at a relatively high density until a plurality of feed injection nozzles 18 (only one is shown) inject feed across the flowing stream of catalyst particles. The resulting mixture continues upwardly through an upper portion of riser 14 to a riser termination device. This specific device utilizes at least two disengaging arms 20 tangentially discharge the mixture of gas and catalyst through openings 22 from a top of riser 14 into disengaging vessel 24 that effects separation of gases from the catalyst. Most of the catalyst discharged from openings 22 fall downwardly in the disengaging vessel 24 into bed 44. Transport conduit 26 carries the separated hydrocarbon vapors with entrained catalyst to one or more cyclones 28 in reactor or separator vessel 30. Cyclones 28 separate spent catalyst from the hydrocarbon vapor stream. Collection chamber 31 gathers the separated hydrocarbon vapor streams from the cyclones for passage to outlet nozzle 32 and into a downstream fractionation zone (not shown). Diplegs 34 discharge catalyst from the cyclones 28 into bed 29 in a lower portion of disengaging vessel 30 which pass through ports 36 into bed 44 in disengaging vessel 24. Catalyst and adsorbed or entrained hydrocarbons pass from disengaging vessel 24 into stripping section 38. Catalyst from openings 22 separated in disengaging vessel 24 passes directly into stripping section 38. Hence, entrances to the stripping section 38 include openings 22 and ports 36. Stripping gas such as steam enters a lower portion of the stripping section 38 through distributor 40 and rises countercurrent to a downward flow of catalyst through the stripping section 38, thereby removing adsorbed and entrained hydrocarbons from the catalyst which flow upwardly through and are ultimately recovered with the steam by the cyclones 28. Distributor 40 distributes the stripping gas around the circumference of stripping section 38. In order to facilitate hydrocarbon removal, structured packing may be provided in stripping section 38. The spent catalyst leaves stripping section 38 through port 48 to reactor conduit 46 and passes into regenerator 12. The catalyst is regenerated in regenerator 12 as is known in the art and sent back to riser 14 through standpipe 16 FIG. 1 also shows regenerator cyclones 11A and 11B as well as nozzle 23.

As is known in the art, FIG. 1 shows addition—withdrawal point 7 connected to stand-pipe 16. FIG. 1 also shows addition—withdrawal point 9 in dense bed 13 of regenerator 12. The drawing also shows opening 23 in regenerator 12. Distributor 40 distributes the stripping gas around circumference 42 of stripping section 38. See FIGS. 1-4 of the drawings. Also see U.S. Pat. No. 7,763,164 and the written description thereof in the specification of U.S Pat. No. 7,763,164.

In cracking carbo-metallic feedstocks in accordance with FCC processes, the regeneration gas may be any gas which can provide oxygen to convert carbon to carbon oxides. Air is highly suitable for this purpose in view of its ready availability. The amount of air required per pound of coke for combustion depends upon the desired carbon dioxide to carbon monoxide ratio in the effluent gases and upon the amount of other combustible materials present in the coke, such as hydrogen, sulfur, nitrogen and other elements capable of forming gaseous oxides at regenerator conditions.

The regenerator is operated at temperatures in the range of about 1000.degree. to 1600.degree. F., preferably 1275.degree. to 1450.degree. F., to achieve adequate combustion while keeping catalyst temperature below those at which significant catalyst degradation can occur. In order to control these temperatures, it is necessary to control the rate of burning which in turn can be controlled at lest in part by the relative amounts of oxidizing gas and carbon introduced into the regeneration zone per unit time.

Figure 2:
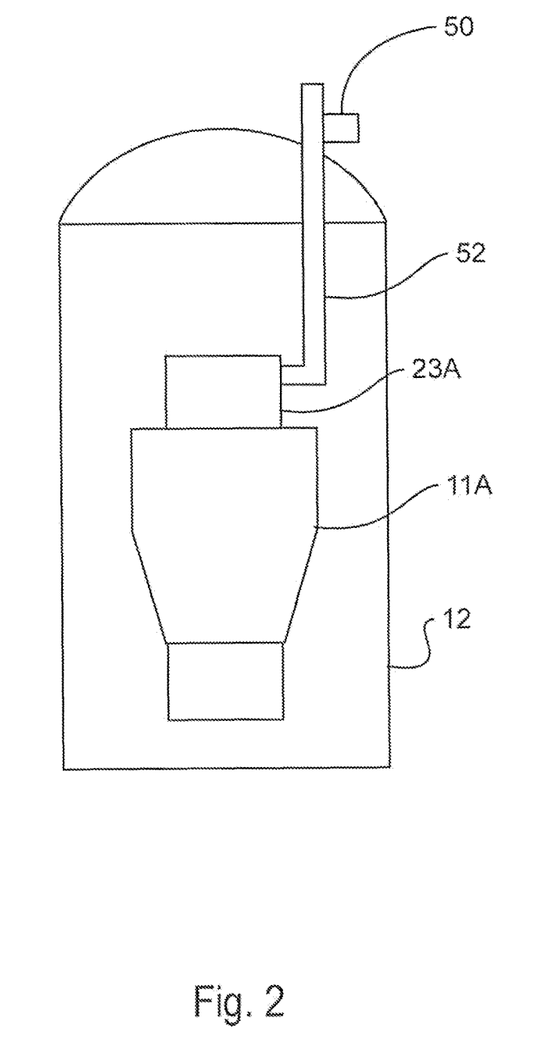
FIG. 2 shows an acoustic emission (AE) sensor and data acquisition system attached to a cyclone.

FIG. 2 shows acoustic emission sensor (AE) sensor and data acquisition system attached to a regenerator cyclone. The AE detectors may be applied as either a waveguide instrument mounted to each cyclone or attached to an existing structure. The following is a general illustration of this concept.

FIG. 2 shows data acquisition system (acoustic emission sensor) 50 attached to a waveguide 52. Waveguide 52 is attached to either cyclone 11A, 11B or 28.

Figure 3:
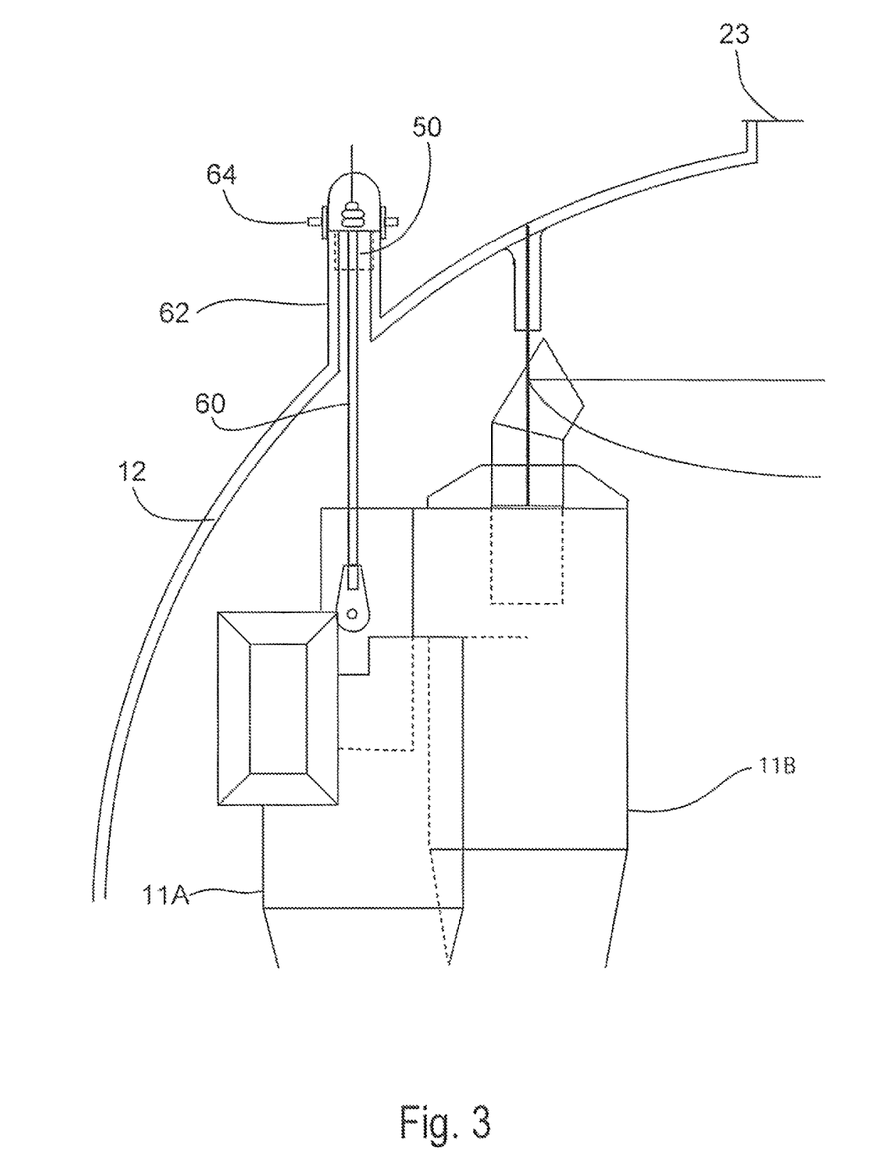
FIG. 3 shows a hanger rod where the AE sensor could be placed.

FIG. 3 shows a hanger rod where the AE sensor could be placed. FIG. 3 illustrates a regen cyclone system. The hanging rod extends through the vessel shell and are a location where an AE detector could be placed.

FIG. 3 shows hanger rod (with clevis) 60. Hanger rod 60 extends through regenerator 12. Support nozzle 62 and support elevation 64 support rod 60. Also shown are other components of a typical FCC unit.

Figure 11:
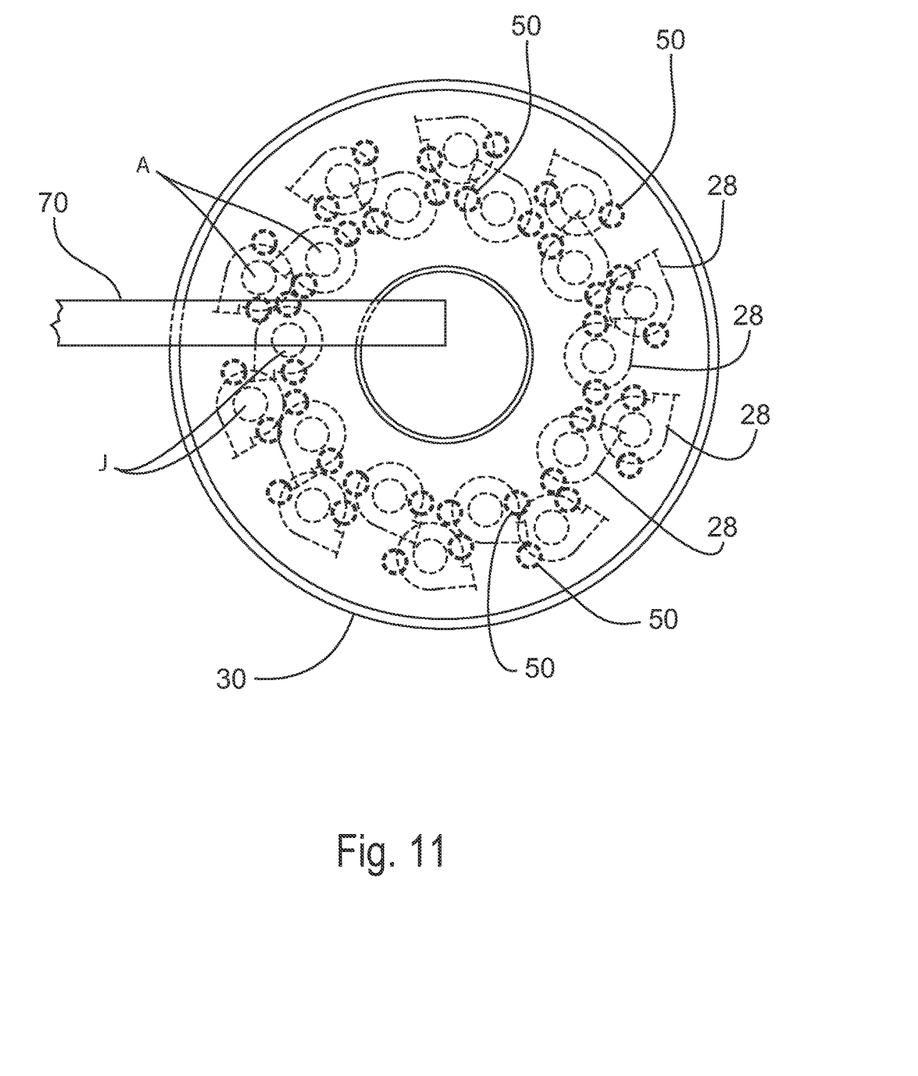
FIG. 11 shows acoustic emission sensors attached to cyclones in the reactor.

FIG. 11 shows acoustic emission sensors 50 attached to cyclone 28 in reactor 30.

EXAMPLES

Description of the Structure

Figure 4:
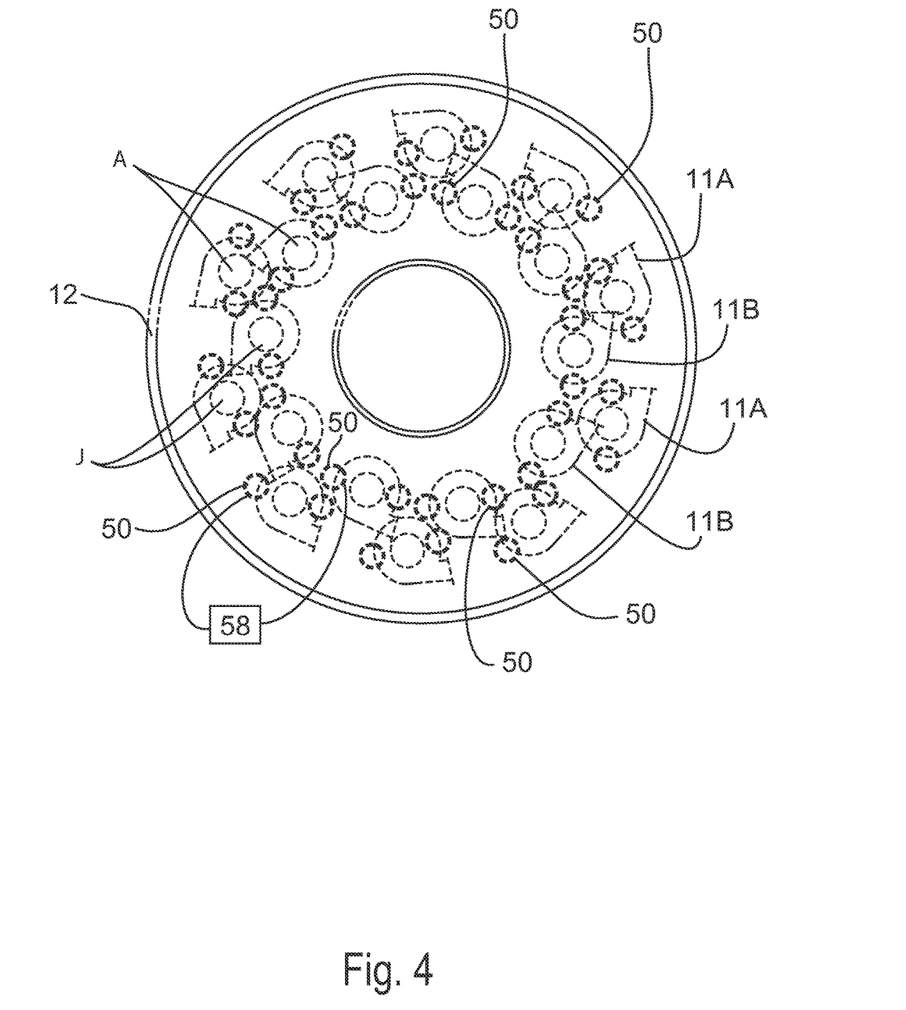
FIG. 4 is a top view showing cyclone labels and monitored locations.

A commercial FCC unit was operating with high catalyst losses from the regenerator. This was due to cyclone damage. An acoustic test was conducted to determine which cyclones were damaged. FIG. 4 is a top view showing cyclone labels and monitored locations. A regenerator having ten first stage cyclones (outside ring) and ten second stage cyclones (inside ring) was tested as follows. The first stage cyclones have two hanger-rod support systems which are called "CT" and "CY". The support system CT is attached across to the inlet; the support system CY is next to the inlet. The second stage cyclones also have two hanger-rod support systems which are called "CU" and "CZ". The support system CU is attached across to the inlet; the support system CZ is next to the inlet.

The hanger-rod support systems are attached the cyclones using bolted pin connections. Understanding the hanger-rod support connection is important as the connection may generate friction emissions if there is any movement during operation.

AE Test Setup

AE system includes AE sensors, pre-amplifiers and data acquisition system. As surface temperature is high, integrated AE sensors (embedded pre-amplifier inside the sensor case) could not be used. The pre-amplifier boost the signal to carry it long distances with minimum current loss.

The initial test plan was to record AE data from four cyclones simultaneously. However, because of access limitations to the hanger-rod support structure, only two locations were monitored simultaneously. One AE sensor was mounted on cyclone A-CY and kept there throughout the testing. Another AE sensor was mounted on each cyclone using a pole and keep monitored for about five minutes.

R6 sensors, which are AE sensors of the resonant type with 35-100 kHz bandwidth and 60 kHz peak frequency, were used. The pre-amplifiers gain was set to 40 dB with additional 6 dB hardware gain. Time driven absolute energy data was recorded every 100 milliseconds. Waveforms 50 milliseconds long were also streamed every 3 seconds. Vaseline was used as acoustic couplant and magnetic hold-down devices held the sensors in place during data acquisition.

AE Test Results

Acoustic emission (AE) consists of transient stress waves produced by rapid release of energy. In this application, AE piezoelectric sensors were mounted on each connection tube and monitored for particle impacts hitting on the cyclone wall. Stress waves emitted by particle impacts propagate through the cyclone wall support to the connection support rod and finally to vessel skin before reaching the AE sensors. It is important to note that AE results are affected by any variation on this path. On the other hand, when a cyclone is monitored continuously, any variation in the AE signal levels could be correlated with process operation provided there is no sudden change on the path. AE results are also affected by AE sensor couplant efficiency.

An FCC vessel may also utilize a microprocessor and software. Wherein, the microprocessor and software are configured to receive signals from the acoustic sensor, and mathematically convert the signals to an output signal indicative of a function of the cyclone and the FCC vessel. The microprocessor and software may also be configured to control the FCC vessel on-line in response to the output signal by adjusting cyclone parameters.

FIG. 4 is a top view showing cyclone labels and monitored locations. FIG. 4 also shows first and second stage cyclones 11A and 11B lettered A through J. First stage cyclones 11A form an outer ring and second stage cyclones 11B form the inner ring. AE sensors 50 also are shown mounted on cyclones 11A and 11B. Network 58 also is shown connecting AE sensors 50 into a network.

Figure 5:
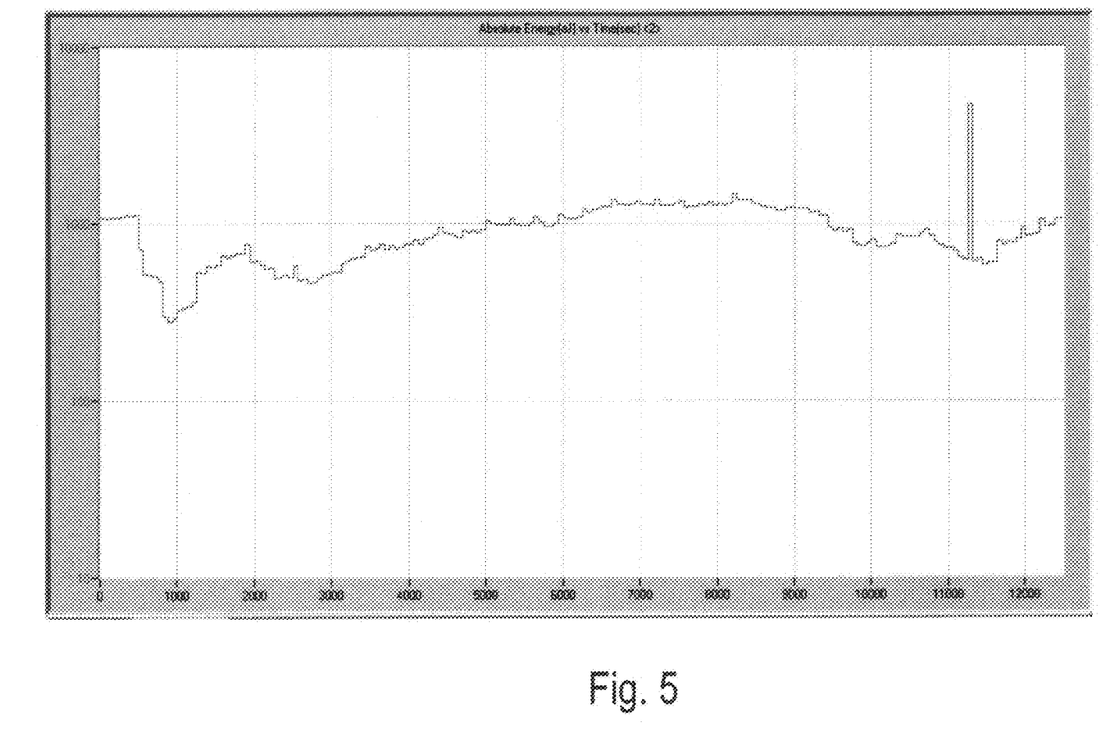
FIG. 5 is a graph showing absolute energy level of AE sensor attached to cyclone A-CY.

FIG. 5 shows the absolute energy variation of cyclone A-CY for about three and a half hour duration monitoring. A the sensor was kept in place throughout the monitoring, the variation in the absolute energy level can be correlated with the variation in process operation.

Table 1 summarizes the absolute energy levels recorded on the monitored cyclones. As mentioned above, the absolute energy levels could be effected by the wave propagation path. However, there are several measurement results which indicate substantial variations from one cycle to another. This indicates a wide variation in process loading and is indicative of higher catalyst losses.

TABLE 1

Absolute energy average levels.

| Cyclone | Stage | Connection | Absolute energy level | Comment |
|---|---|---|---|---|
| A | 1st stage | CT | 168 | AE sensor was mounted on this connection and kept there throughout the testing |
|  |  | CY | 900 |  |
|  | 2nd stage | CU | 84 |  |
|  |  | CZ | 105 |  |
| B | 1st stage | CT | 121 |  |
|  |  | CY | 50 |  |
|  | 2nd stage | CU | 133 |  |
|  |  | CZ | 315 |  |
| C | 1st stage | CT | 50 |  |
|  |  | CY | 87 |  |
|  | 2nd stage | CU | 191 |  |
|  |  | CZ | 53 |  |

TABLE 1-continued

Absolute energy average levels.

| Cyclone | Stage | Connection | Absolute energy level | Comment |
|---|---|---|---|---|
| D | 1st stage | CT | 49 |  |
|  |  | CY | 57 |  |
|  | 2nd stage | CU | 109 |  |
|  |  | CZ | 48 |  |
| E | 1st stage | CT | 125600 | Highly fluctuating AE level |
|  |  | CY | 60 |  |
|  | 2nd stage | CU | 62 |  |
|  |  | CZ | 105 |  |
| F | 1st stage | CT | 61 |  |
|  |  | CY | 91 |  |
|  | 2nd stage | CU | 3 |  |
|  |  | CZ | 56 |  |
| G | 1st stage | CT | 3470 | Highly fluctuating AE level |
|  |  | CY | 374 |  |
|  | 2nd stage | CU | 53 |  |
|  |  | CZ | 1 |  |
| H | 1st stage | CT | 506 | Highly fluctuating AE level |
|  |  | CY | 51 |  |
|  | 2nd stage | CU | 66 |  |
|  |  | CZ | 61 |  |
| I | 1st stage | CT | 103 |  |
|  |  | CY | 54 |  |
|  | 2nd stage | CU | 156 |  |
|  |  | CZ | 1505 | Similar behavior as cyclone A-CY |
| J | 1st stage | CT | 403 |  |
|  |  | CY | 66 |  |
|  | 2nd stage | CU | 240 |  |
|  |  | CZ | 134 |  |

Figure 6:
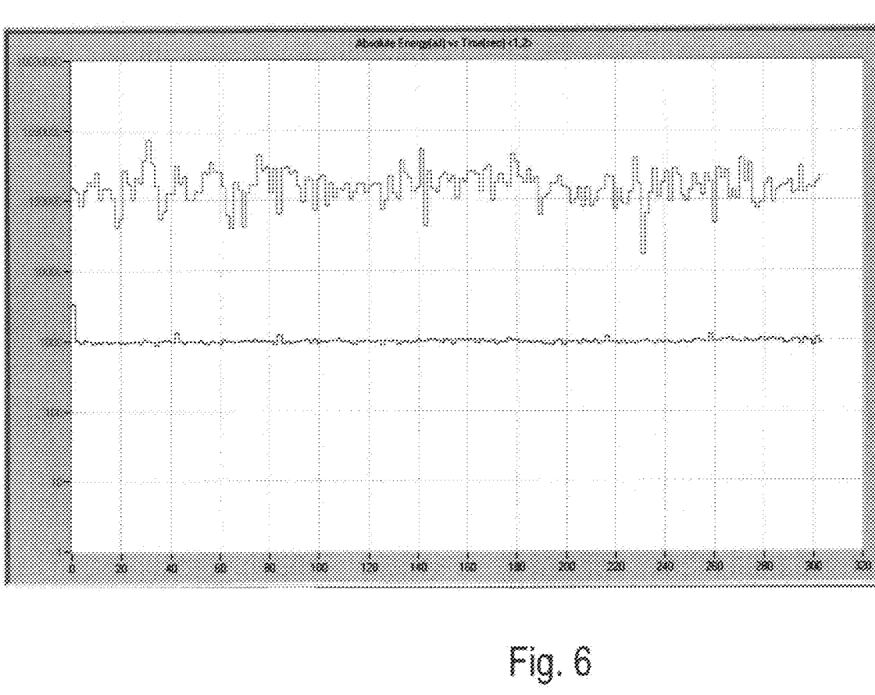
FIG. 6 is a graph showing absolute energy levels of cyclone E-CT (channel 1) and cyclone A-CY (channel 2).
Figure 7:
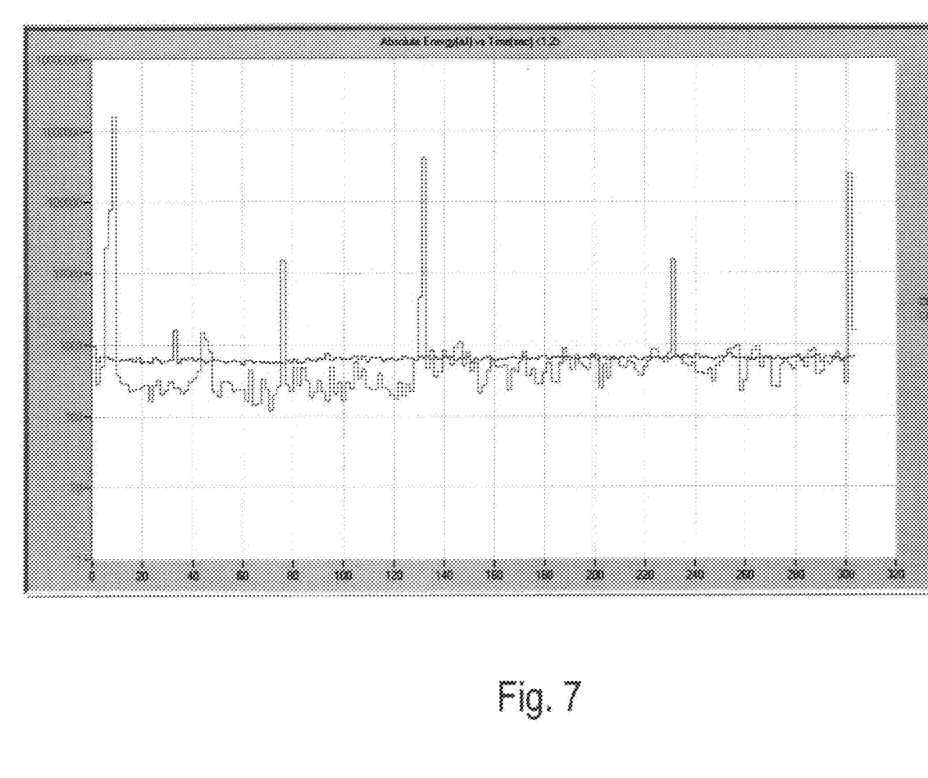
FIG. 7 is a graph showing absolute energy levels of cyclone H-CT (channel 1) and cyclone A-CY (channel 2).

FIG. 6 and FIG. 7 show how absolute energy values fluctuate for cyclones E-CT and H-CT for a 5-minute monitoring test. The absolute energy values fluctuate considerably as compared to the other channel. Please note that sudden increases are due to movement of the pole.

The commercial unit was shutdown and inspected following completion of the AE testing. The inspection found several damaged cyclones as identified from the AE test results. This confirms the practice of using AE detectors on a commercial unit can be used to measure solids loading and be a useful tool for monitoring and troubleshooting.

Actual Time Occurrence of Cyclone A-CY

FIG. 5 shows the result of linking individual files assuming there was no time gap. The data acquisition system was stopped and restarted when a new cyclone was monitored. Therefore, all individual data files need to be linked using the software in order to obtain the response of cyclone A-CY which was monitored throughout the testing date.

Figure 8:
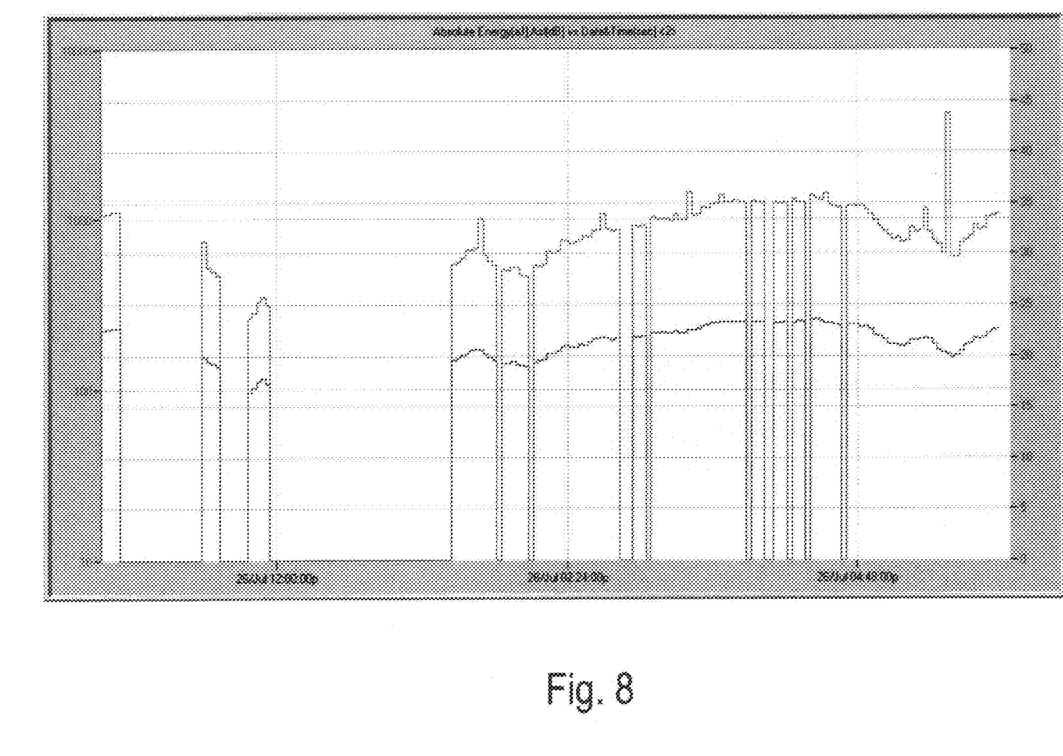
FIG. 8 is a graph showing actual record time of the data recorded from cyclone A-CY.

FIG. 8 includes the time gaps between each acquisition. For example, the time gap from noon to 1:30 pm includes the lunch break. The line represents ASL-Average Signal Level. ASL represents the change in signal amplitude over time. Absolute energy is derived from the integral of the squared voltage signal.

Waveform Streaming Results

Waveform stream enables various signal processing options after data acquisition. Independent from threshold, the data acquisition unit captures long duration waveforms (50 milliseconds) from AE sensors every defined time interval (3 seconds for this test).

Figure 9:
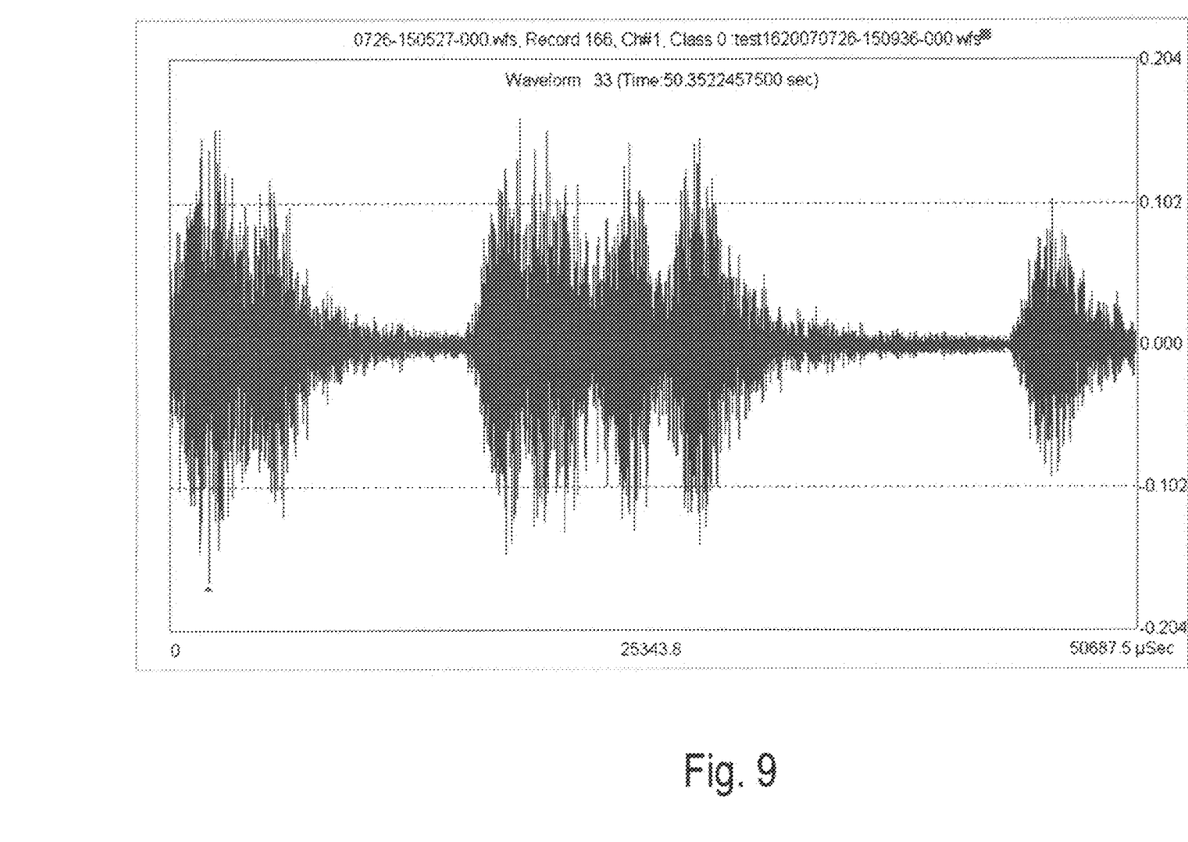
FIG. 9 is a long streamed waveform recorded from cyclone E-CT.

FIG. 9 shows an example of a long waveform captured from cyclone E-CY. The waveform indicates multiple impacts with random intervals.

Cold Flow Model

Additional testing was done in a cold flow model. Instead of using an actual unit, a plexy-glass model in a lab was used to evaluate the technique. This testing showed that frequency centroid shifts toward lower values when the load in a cyclone is increased. The frequency centroid results from performing FFT and carrying the calculation of summing magnitude multiplied by frequency and dividing this summation to the summation of FFT magnitude. The frequency centroid represents the first moment of frequency spectrum.

Figure 10:
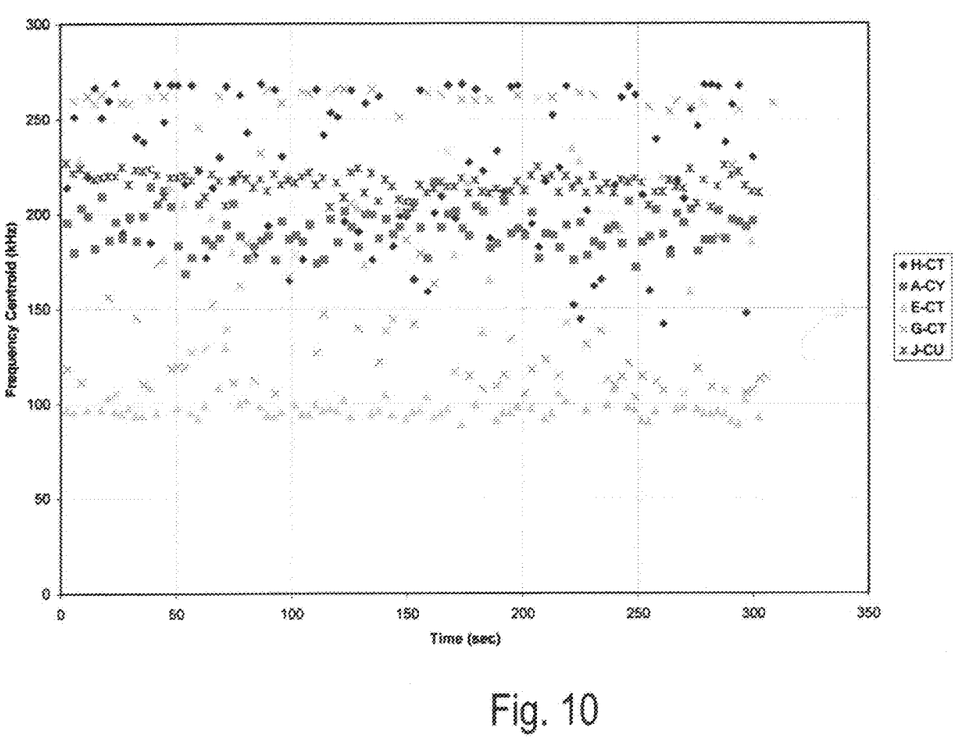
FIG. 10 is a plot graph showing frequency centroid values (extracted from streamed waveforms) recorded from five cyclone connections.

FIG. 10 shows the frequency centroid values recorded from five cyclones evaluated in the cold flow model. The frequency centroid values were calculated from streaming waveforms and NOESIS pattern recognition software was used to perform the calculation. The values of cyclones E-CT and G-CT are lower as compared to the other three cyclones. We conclude that these two cyclones are loaded more.

SUMMARY

Continuous monitoring of cyclone A-CY shows the variation due to process operation very well. It is important to keep the acoustic coupling efficiency same through the test.

Cyclones E-GT, H-CT, and G-CT have highly varying acoustic levels. This may indicate some stability issue, i.e., cyclone movement during operation, or more catalyst entrance.

We would expect that acoustic activities of the second stage cyclones were less than those of the first stage cyclones provided their hanger-rod connection systems were similar. While we don't now the conditions of the hanger-rod connection systems, the cyclone I-CZ—the support connected to the second stage of cyclone I—shows higher absolute energy level than the first stage connections of cyclone I. This may indicate that more catalyst passes to the second stage cyclone.

Use of AE detectors on a commercial FCC unit identified several cyclones that were not performing as well as others. A subsequent unit inspection confirmed cyclone damage. This validates AE detectors are viable for FCC unit cyclone monitoring.

Modifications

Specific compositions, methods, or embodiments discussed are intended to be only illustrative of the invention disclosed by this specification. Variation on these compositions, methods or embodiments are readily apparent to a person of skill in the art based upon the teachings of this specification and are therefore intended to be included as part of the inventions disclosed herein.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the being defined solely by the appended claims.

I claim:

1. A fluid catalytic cracking (FCC) vessel containing a cyclone for separating solids from a solids-gas mixture wherein:
   the cyclone comprising an outlet, an acoustic sensor attached to the outlet with a waveguide;
   a microprocessor and software configured to receive signals from the acoustic sensor, and mathematically convert the signals to an output signal indicative of the function of the cyclone; and
   wherein, the cyclone and the FCC vessel, are controlled on-line in response to the output signal.

2. A fluid catalytic cracking (FCC) vessel comprising:
   a cyclone for separating solids from a solids gas mixture, wherein the cyclone comprises an interior cavity and an exterior;
   an acoustic sensor connected to the exterior of the cyclone, without piercing the interior cavity;
   a microprocessor and software configured to receive signals from the acoustic sensor;
   the microprocessor and software configured to convert the signals to an output signal indicative of a function of the cyclone and the FCC vessel; and
   the microprocessor and software configured to control the cyclone and FCC vessel on-line in response to the output signal.

3. A fluid catalytic cracking (FCC) vessel comprising:
   at least one cyclone for separating solids from a solids gas mixture, wherein the at least one cyclone comprises an outlet;
   an acoustic sensor;
   a waveguide instrument connecting the acoustic sensor and the outlet of the at least one cyclone; and
   a microprocessor and software configured to receive signals from the acoustic sensor;
   the microprocessor and software configured to convert the signals to an output signal indicative of a function of the at least one cyclone and the FCC vessel; and
   the microprocessor and software configured to control the at least one cyclone and the FCC vessel on-line in response to the output signal.

4. A method of monitoring and controlling a cyclone in a fluid catalytic cracking (FCC) vessel comprising:
   providing an acoustic sensor;
   providing a waveguide;
   attaching the acoustic sensor to an outlet of the cyclone with the waveguide;
   providing a microprocessor and software;
   configuring the microprocessor and software to receive signals from the acoustic sensor;
   configuring the microprocessor and software to mathematically convert the signals to an output signal indicating the function of the cyclone and the FCC vessel; and
   controlling the cyclone and the FCC vessel on-line in response to the output signal received.

5. A method of monitoring and controlling the performance of a fluid catalytic cracking (FCC) vessel comprising:
   providing at least one cyclone for separating solids from a solids-gas mixture;
   providing an acoustic sensor;
   providing a waveguide;
   attaching the acoustic sensors to the waveguide;
   attaching the acoustic sensors and waveguide to an outlet of the at least one cyclone;

providing a microprocessor and software;
configuring the microprocessor and software to receive signals from the acoustic sensor;
configuring the microprocessor and software to mathematically convert the signals received from the acoustic sensor to an output signal indicating the performance of the at least one cyclone and the FCC vessel; and
controlling the FCC vessel and the at least one cyclone on-line in response to the output signal.

6. A method of monitoring and controlling the performance of a fluid catalytic cracking (FCC) vessel comprising:
providing at least one cyclone for separating solids from a solids-gas mixture;
providing an acoustic sensor;
providing a waveguide;
attaching the acoustic sensor and the waveguide to an outlet of the at least one cyclone;
providing a microprocessor and software;
configuring the microprocessor and software to receive signals from the acoustic sensor;
configuring the microprocessor and software to convert the signals to an output signal indicative of the function of the at least one cyclone; and
controlling the at least one cyclone on-line in response to the output signal.

7. A fluid catalytic cracking (FCC) vessel comprising:
a cyclone for separating solids from a solids gas mixture, wherein the cyclone comprises an interior cavity and an exterior;
an acoustic sensor;
a waveguide instrument connecting the acoustic sensor and the exterior of the cyclone, without piercing the interior cavity; and
a microprocessor and software configured to receive signals from the acoustic sensor;
the microprocessor and software configured to convert the signals to an output signal indicative of a function of the cyclone and the FCC vessel; and
the microprocessor and software configured to control the cyclone and the FCC vessel on-line in response to the output signal.

8. A fluid catalytic cracking (FCC) vessel containing a cyclone for separating solids from a solids-gas mixture wherein:
the cyclone having a hanger rod attached;
an acoustic sensor attached to the hanger rod;
a microprocessor and software configured to receive signals from the acoustic sensor, and mathematically convert the signals to an output signal indicative of the function of the cyclone; and
wherein, the cyclone and the FCC vessel, are controlled on-line in response to the output signal.

* * * * *